(12) United States Patent
Tanizawa

(10) Patent No.: US 11,318,893 B2
(45) Date of Patent: May 3, 2022

(54) DISPLAY CONTROL SYSTEM AND DISPLAY CONTROL METHOD

(71) Applicant: Toyota Jidosha Kabushiki Kaisha, Toyota (JP)

(72) Inventor: Tatsuya Tanizawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 428 days.

(21) Appl. No.: 16/259,071

(22) Filed: Jan. 28, 2019

(65) Prior Publication Data

US 2020/0262359 A1 Aug. 20, 2020

(30) Foreign Application Priority Data

Jan. 29, 2018 (JP) .............................. JP2018-012248

(51) Int. Cl.
*B60K 37/06* (2006.01)
*B60R 11/02* (2006.01)
*G06F 1/3234* (2019.01)
*G06F 3/04847* (2022.01)
*G06F 9/30* (2018.01)

(52) U.S. Cl.
CPC .......... *B60R 11/0252* (2013.01); *B60K 37/06* (2013.01); *G06F 1/3265* (2013.01); *G06F 3/04847* (2013.01); *G06F 9/30* (2013.01)

(58) Field of Classification Search
CPC ..................................................... B60K 37/06
See application file for complete search history.

(56) References Cited

U.S. PATENT DOCUMENTS

| 2003/0156097 | A1* | 8/2003 | Kakihara | ........... | G01C 21/3688 |
| | | | | | 345/156 |
| 2006/0155665 | A1 | 7/2006 | Sekiyama | | |
| 2010/0015947 | A1* | 1/2010 | Heo | ........... | H04W 4/16 |
| | | | | | 455/410 |
| 2014/0280580 | A1* | 9/2014 | Langlois | ........... | B60K 37/06 |
| | | | | | 709/204 |

(Continued)

FOREIGN PATENT DOCUMENTS

| CN | 107580104 A | 1/2018 |
| JP | 2002-350154 A | 12/2002 |

(Continued)

*Primary Examiner* — Peter D Nolan
*Assistant Examiner* — Roy Rhee
(74) *Attorney, Agent, or Firm* — Dinsmore & Shohl LLP

(57) ABSTRACT

A display control system includes a mobile terminal device and an in-vehicle device. The mobile terminal device is configured to display an agent image by executing an agent program. The in-vehicle device is configured to display an agent image by executing an agent program. The in-vehicle device includes a detection unit and a display control unit. The detection unit is configured to detect the mobile terminal device as a result of receiving identification information from the mobile terminal device. The display control unit is configured to, when the mobile terminal device has been detected by the detection unit, cause the in-vehicle device to display the agent image. The mobile terminal device is configured to, when the display control unit causes the in-vehicle device to display the agent image, prohibit display of the agent image on the mobile terminal device.

11 Claims, 3 Drawing Sheets

(56) References Cited

U.S. PATENT DOCUMENTS

| | | | | |
|---|---|---|---|---|
| 2015/0258961 | A1* | 9/2015 | Doherty | B60R 25/1012 |
| | | | | 701/2 |
| 2017/0026776 | A1* | 1/2017 | Mohdi | H04W 8/005 |
| 2018/0014182 | A1 | 1/2018 | Jaegal et al. | |
| 2018/0198313 | A1* | 7/2018 | Lee | H02J 50/12 |

FOREIGN PATENT DOCUMENTS

| | | | |
|---|---|---|---|
| JP | 2006-195578 | A | 7/2006 |
| JP | 2009-025703 | A | 2/2009 |
| JP | 2009-190668 | A | 8/2009 |
| JP | 2011-169632 | A | 9/2011 |
| JP | 2014-033581 | A | 2/2014 |
| JP | 2015-194864 | A | 11/2015 |

\* cited by examiner

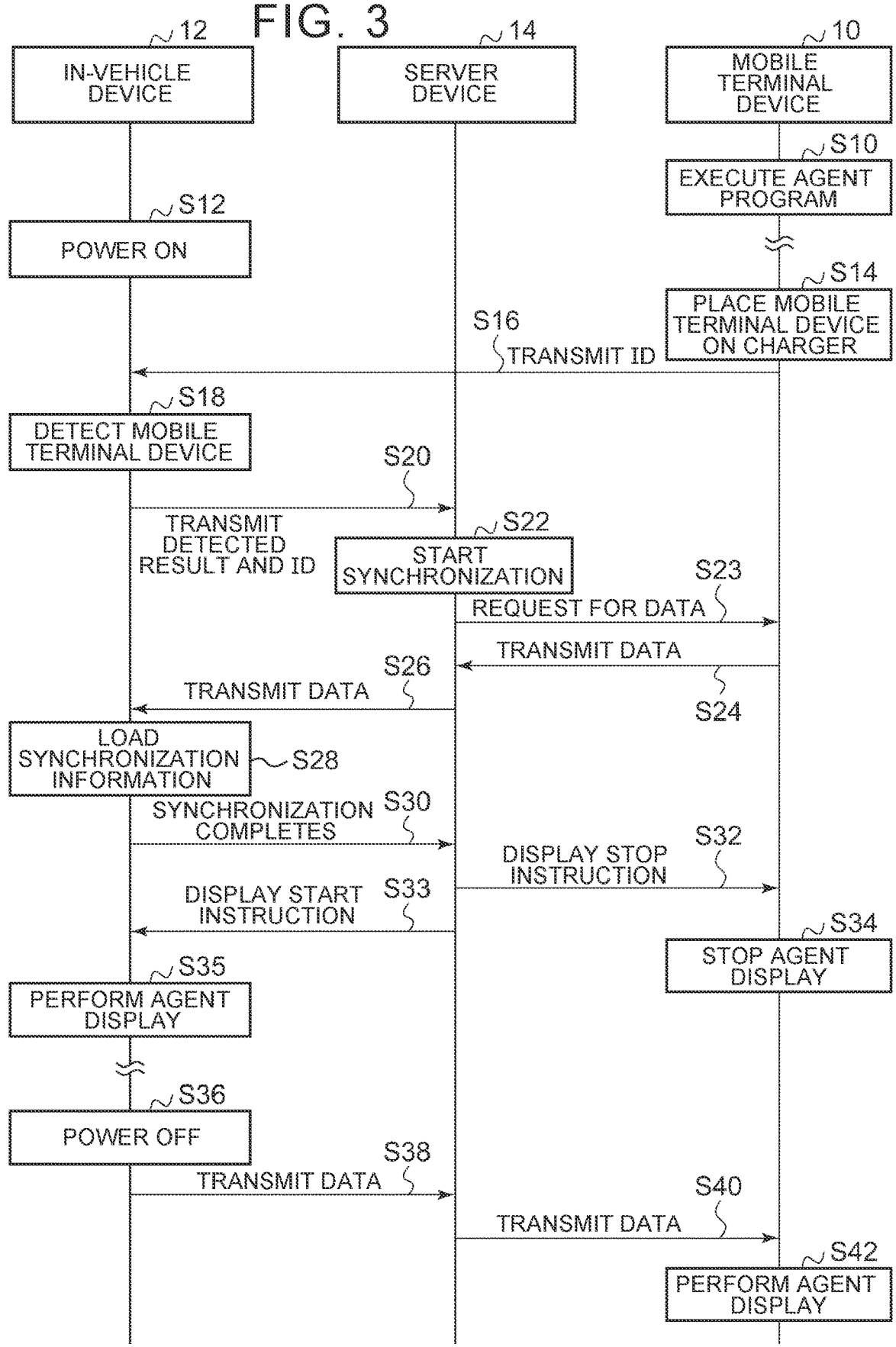

DISPLAY CONTROL SYSTEM AND DISPLAY CONTROL METHOD

CROSS-REFERENCE TO RELATED APPLICATIONS

This application claims priority to Japanese Patent Application No. 2018-012248 filed on Jan. 29, 2018, which is incorporated herein by reference in its entirety including the specification, drawings and abstract.

BACKGROUND

1. Technical Field

The present disclosure relates to a technique for controlling display of an image, caused by an agent program.

2. Description of Related Art

Japanese Unexamined Patent Application Publication No. 2006-195578 (JP 2006-195578 A) describes a vehicle agent device. The vehicle agent device observes operating conditions of a vehicle based on information from sensors, learns the observed results by storing the observed results together with the information from the sensors, determines a communication behavior with a user based on the learned results, and displays an agent image expressing the determined communication behavior. The vehicle agent device determines a communication behavior by incorporating information, acquired outside and stored in a mobile terminal device, into learned results. The agent device has a communication function that provides an interaction with an anthropomorphic agent, learns various pieces of information, such as user's personality, activity, hobby, and taste, and recommends optimum information to the user.

SUMMARY

With the technique described in JP 2006-195578 A, an agent image is displayed on each of the mobile terminal device and the vehicle agent device; however, when an agent image is displayed on each of the mobile terminal device and the vehicle agent device in the case where the mobile terminal device is located inside the vehicle, a driver may be confused about which agent to communicate with.

The present disclosure provides a technique for allowing a driver to easily recognize an agent image that is displayed on a mobile terminal device and an agent image that is displayed on an in-vehicle device.

An aspect of the disclosure relates to a display control system. The display control system includes a mobile terminal device and an in-vehicle device. The mobile terminal device is configured to display a first agent image by executing a first agent program. The in-vehicle device is configured to display a second agent image by executing a second agent program. The in-vehicle device includes a detection unit and a display control unit. The detection unit is configured to detect the mobile terminal device as a result of receiving identification information from the mobile terminal device. The display control unit is configured to, when the mobile terminal device has been detected by the detection unit, cause the in-vehicle device to display the second agent image. The mobile terminal device is configured to, when the display control unit causes the in-vehicle device to display the second agent image, prohibit display of the first agent image on the mobile terminal device.

According to this aspect, when the in-vehicle device detects the mobile terminal device, the first agent image displayed on the mobile terminal device is not displayed, and the second agent image is displayed on the in-vehicle device, so a driver easily recognizes the second agent image. When the agent program is executed, for example, an anthropomorphic agent image is displayed. The anthropomorphic agent image communicates with the driver or a passenger, and various controls are executed in response to the result of the communication.

The in-vehicle device may include a charger for supplying electric power to the mobile terminal device. The detection unit may be configured to, when the mobile terminal device is in a state where the mobile terminal device is able to receive electric power from the charger, detect the mobile terminal device. The charger may include a communication unit configured to be able to carry out short-range wireless communication with the mobile terminal device. The mobile terminal device may be configured to, when the mobile terminal device is in the state where the mobile terminal device is able to receive electric power from the charger, transmit the identification information to the communication unit by short-range wireless communication.

The mobile terminal device may be configured to, when the mobile terminal device enters a state where the mobile terminal device is not able to receive electric power from the charger from the state where the mobile terminal device is able to receive electric power from the charger or when power of the in-vehicle device turns off, allow display of the agent image. The display control unit may be configured to, as the display control unit detects that a vehicle has started moving, cause the in-vehicle device to display the second agent image. The mobile terminal device may be configured to prohibit display of the first agent image on the mobile terminal device while the vehicle is moving.

Another aspect of the disclosure relates to a display control method. The display control method is a method of controlling display of a first agent image on a mobile terminal device configured to display the first agent image by executing a first agent program and display of a second agent image on an in-vehicle device configured to display the second agent image by executing a second agent program. The display control method includes: detecting, by the in-vehicle device, the mobile terminal device as a result of receiving identification information from the mobile terminal device; when the mobile terminal device has been detected, displaying, by the in-vehicle device, the second agent image; and, after the mobile terminal device has been detected, prohibiting, by the mobile terminal device, display of the first agent image on the mobile terminal device.

According to this aspect, when the in-vehicle device detects the mobile terminal device, the first agent image displayed on the mobile terminal device is not displayed, and the second agent image is displayed on the in-vehicle device, so a driver easily recognizes the second agent image.

According to the aspects of the disclosure, it is possible to provide a technique for allowing a driver to easily recognize an agent image that is displayed on a mobile terminal device and an agent image that is displayed on an in-vehicle device.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart for illustrating the process of switching display of the agent image.

DETAILED DESCRIPTION OF EMBODIMENTS

Figure 1:
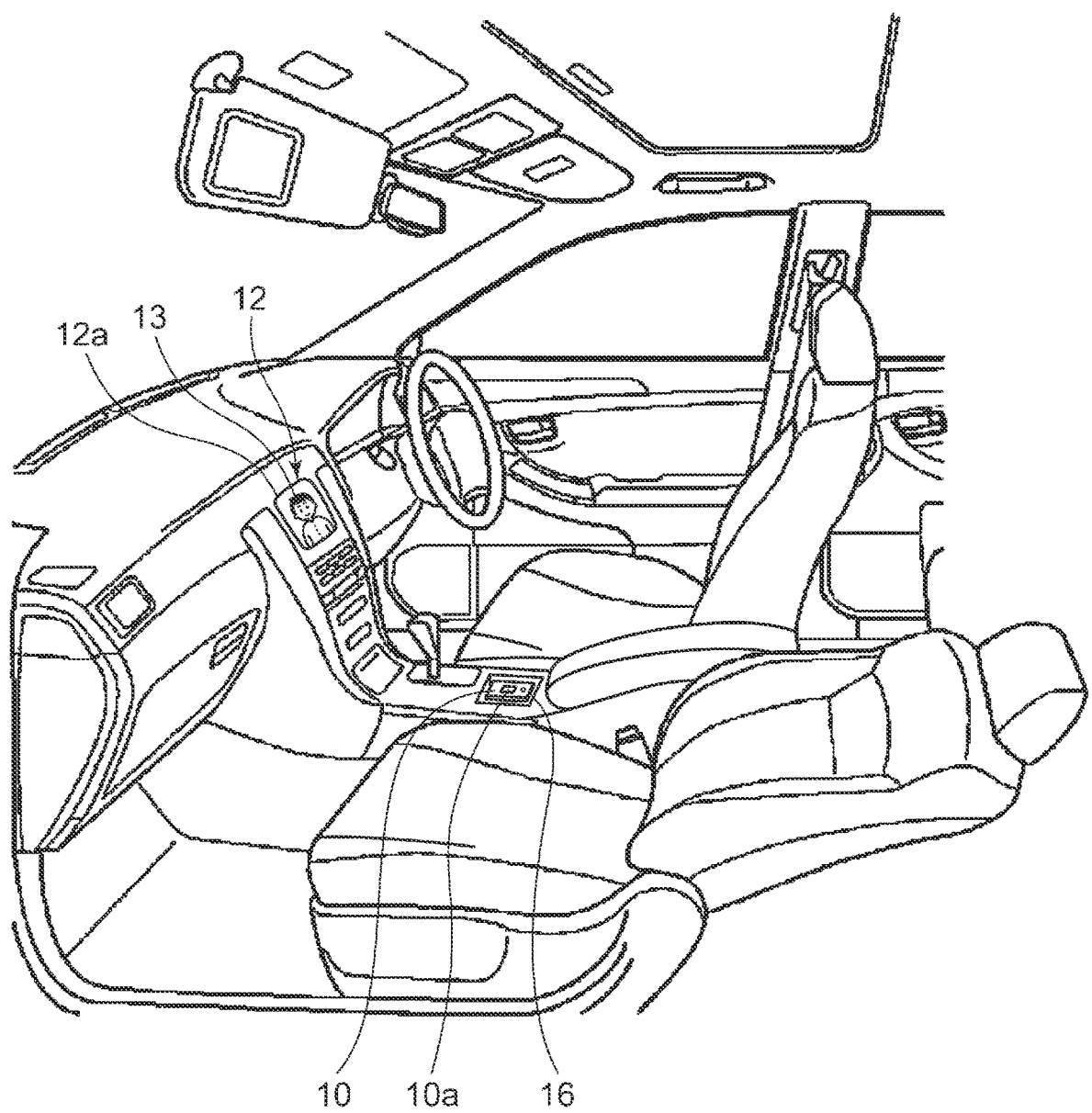
FIG. 1 is a diagram for illustrating a display control system that controls display of an agent image according to an embodiment.

FIG. 1 is a diagram for illustrating a display control system that controls display of an agent image according to an embodiment. The display control system includes a mobile terminal device 10, an in-vehicle device 12, and a server device (not shown).

Each of the mobile terminal device 10 and the in-vehicle device 12 is able to execute an agent program that provides information to a driver. The agent program exchanges information with the driver mainly by interaction, provides information by voice and/or image, and provides information about running while running, thus assisting the driver in driving.

For example, as shown in FIG. 1, an agent image that is displayed by executing the agent program is displayed on a display 12a of the in-vehicle device 12 as an animation character 13, so the driver is allowed to easily recognize the object with which the driver interacts. The mobile terminal device 10 is also able to display a character on a display 10a when the mobile terminal device 10 is executing the agent program. The character 13 that is displayed as the agent image may be superimposed on an image showing an active function, that is, for example, a destination guidance image. In the following description, displaying the agent image may be simply referred to as agent display.

The in-vehicle device 12 includes a charger 16. The charger 16 supplies electric power to the mobile terminal device 10. The charger 16 is able to feed electric power to the mobile terminal device 10 in a noncontact manner. The charger 16 wirelessly feeds electric power to the mobile terminal device 10 in a state where the mobile terminal device 10 is placed on the charger 16.

The charger 16 is provided in a center console located between a driver seat and a passenger seat. The charger 16 has a recessed mount so that the mobile terminal device 10 is accommodated in the mount. The mobile terminal device 10 shown in FIG. 1 is placed on the charger 16. The mobile terminal device 10 is in a state where the mobile terminal device 10 is able to receive electric power. The charger 16 is not limited to the one that feeds electric power in a noncontact manner. The charger 16 may be the one that feeds electric power by wire.

Figure 2:
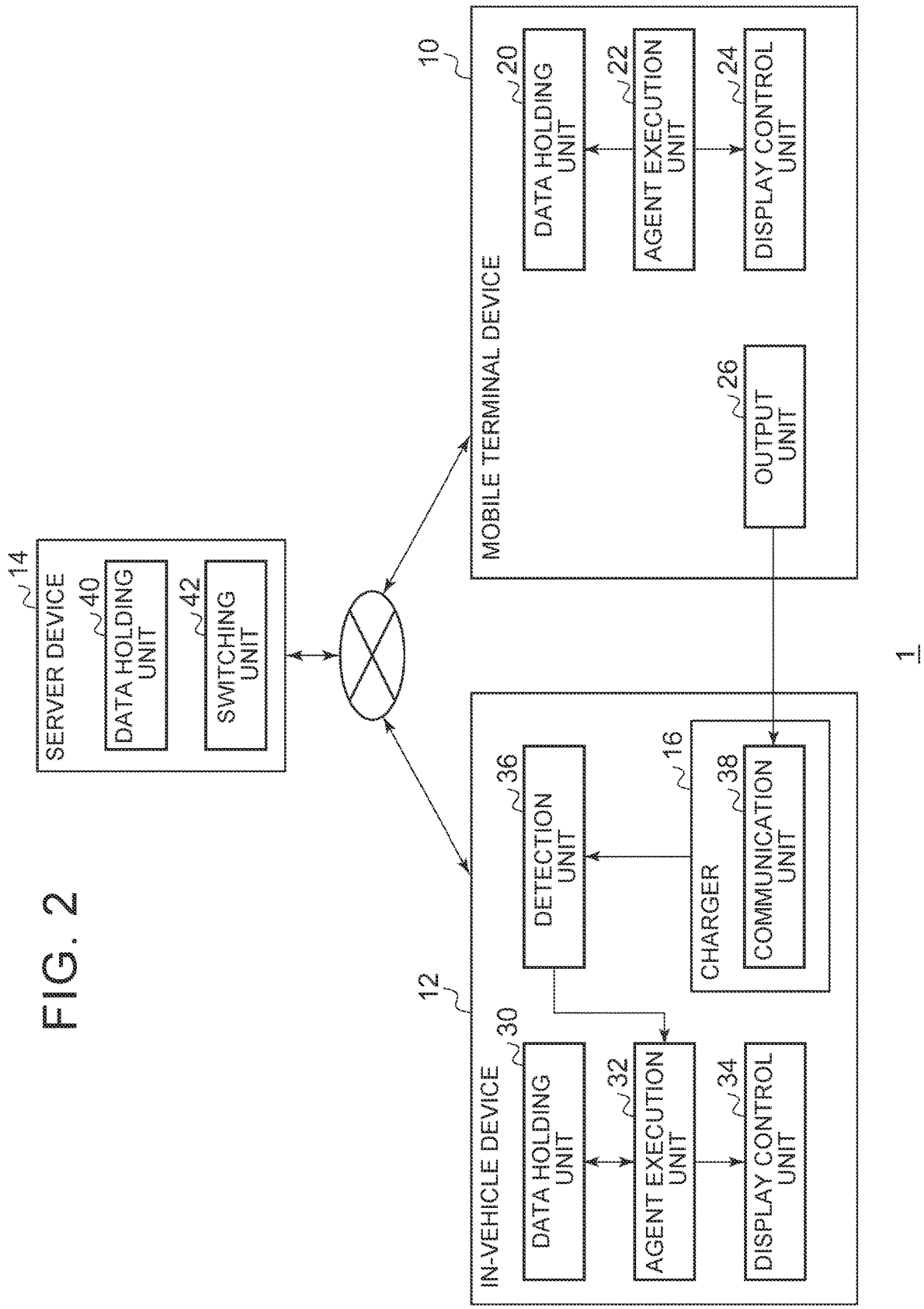
FIG. 2 is a block diagram for illustrating the functional configuration of the display control system.

FIG. 2 is a block diagram for illustrating the functional configuration of the display control system 1. In FIG. 2, each of elements that are described as functional blocks that execute various processes may be formed of a circuit block, a memory, and another LSI, as hardware, and may be implemented by, for example, a program loaded onto the memory, as software. Therefore, persons skilled in the art understand that these functional blocks may be implemented in various forms only by hardware, only by software, or by a combination of both, and these functional blocks are not limited to forms implemented by any one of hardware and software.

The mobile terminal device 10 includes a data holding unit 20, an agent execution unit 22, a display control unit 24, and an output unit 26. The in-vehicle device 12 includes a data holding unit 30, an agent execution unit 32, a display control unit 34, a detection unit 36, and the charger 16. The charger 16 includes a communication unit 38. The communication unit 38 is able to carry out short-range wireless communication with the mobile terminal device 10. The server device 14 includes a data holding unit 40 and a switching unit 42.

The data holding unit 20 of the mobile terminal device 10 has a mobile terminal ID and an agent ID, and associates the mobile terminal device 10 with the agent program. The mobile terminal ID and the agent ID that are held by the data holding unit 20 are managed so as to be associated with each other by the server device 14 from when the mobile terminal device 10 has started the agent program.

The output unit 26 transmits identification information of at least one of the mobile terminal ID and the agent ID to the communication unit 38 of the charger 16 by short-range wireless communication. The mode of short-range wireless communication is, for example, the standards of near field communication (NFC), and is communicable within a range of approximately 10 centimeters. With this configuration, the in-vehicle device 12 is allowed to recognize that the location of the mobile terminal device 10 is on the charger 16. The mode of short-range wireless communication may be the one that is communicable within a range of approximately 0.5 meters to one meter, such as Bluetooth (registered trademark). In any case, the mobile terminal device 10 and the in-vehicle device 12 directly carry out communication with each other at a distance at which it is recognized that the mobile terminal device 10 is located inside the vehicle.

When the mobile terminal device 10 is in the state where the mobile terminal device 10 is able to receive electric power from the charger 16, the output unit 26 transmits the identification information to the communication unit 38. The output unit 26 transmits the identification information to the communication unit 38 as a power supply circuit of the mobile terminal device 10 has detected electric power supplied from the charger 16. The state where the mobile terminal device 10 is able to receive electric power from the charger 16 is a state where the power supply circuit of the mobile terminal device 10 is able to detect electric power supplied from the charger 16, and is a state where the mobile terminal device 10 is placed near the charger 16, such as the state where the mobile terminal device 10 is placed on the charger 16. Thus, the in-vehicle device 12 is able to detect which mobile terminal device 10 is placed on the charger 16.

The agent execution unit 22 executes the agent program, recognizes user's speech, and answers the speech. Thus, the agent execution unit 22 realizes communication with a user. For example, the agent execution unit 22 prompts the user to speak about a destination by outputting "Where are you going?" by voice. When the agent execution unit 22 acquires a speech about a destination from the user, the agent execution unit 22 outputs sightseeing information, or the like, of the destination.

The agent execution unit 22 generates an agent image, and transmits the agent image to the display control unit 24. The agent image is not limited to the one showing a character. The agent image may be an image based on information to be provided.

Since the agent program is executed not only on the mobile terminal device 10 but also on the in-vehicle device 12, the agent execution unit 22 transmits information for synchronization with the agent execution unit 32 of the in-vehicle device 12 via the server device 14. That is, the agent execution unit 22 transmits synchronization information for transferring a task being executed by the agent execution unit 22 to the in-vehicle-side agent execution unit 32 via the server device 14, and the in-vehicle-side agent execution unit 32 takes over the task of the mobile terminal-side agent execution unit 22. The agent execution unit 22 receives the synchronization information transmitted from the in-vehicle device 12 to the mobile terminal device 10, and the mobile terminal device 10 takes over the task in the in-vehicle device 12.

The synchronization information includes information about an active task, information about a character that represents an agent image, and the like. For example, when the agent program is executing the task of providing destination guidance, information about the task includes information indicating a destination, route information in guidance, and the like. With the synchronization information, the status of the active agent in one of the devices is allowed to be reflected in the other one of the devices.

The display control unit 24 executes control for causing the display 10a to display an agent image. The display control unit 24 outputs the mobile terminal ID and/or the agent ID to the in-vehicle device 12, and then prohibits display of an agent image in response to an instruction from the server device 14. Thus, when the driver places the mobile terminal device 10 on the charger 16, the display control unit 24 determines that the driver has stopped using the mobile terminal device 10, and stops display of the agent image. The mobile terminal-side display control unit 24 stops display of the agent image. On the other hand, the in-vehicle-side display control unit 34 starts display of the agent image as will be described in detail later. Thus, the driver easily recognizes which one of the mobile terminal device 10 and the in-vehicle device 12 the driver communicates with. Even when agent display is stopped, the agent execution unit 22 may execute the agent program.

When the mobile terminal device 10 comes off from the charger 16 and becomes not able to receive electric power from the charger 16 in a state where the mobile terminal device 10 is able to receive electric power from the charger 16 or when the power of the in-vehicle device 12 turns off, the display control unit 24 allows display of the agent image. That is, when the driver picks up the mobile terminal device 10 in the state where the mobile terminal device 10 is placed on the charger 16 or when the accessory power of the vehicle is turned off, agent display on the in-vehicle device 12 is switched to agent display on the mobile terminal device 10. The state where the mobile terminal device 10 is not able to receive electric power from the charger 16 means a state where the mobile terminal device 10 and the charger 16 are located a predetermined distance or longer away from each other in the case of wireless power feeding, and means a state where connection terminals of the mobile terminal device 10 and charger 16 are separated away from each other in the case of wired power feeding. In this way, when the driver operates the mobile terminal device 10, it is possible to allow the driver to easily recognize the agent image by automatically switching agent display.

The in-vehicle device 12 starts up when the accessory power of the vehicle is turned on, and becomes able to feed electric power from the charger 16. That is, the fact that the accessory power is on is one of conditions for switching from agent display on the mobile terminal device 10 to agent display on the in-vehicle device 12.

As the communication unit 38 provided in the charger 16 directly receives the identification information, that is, the mobile terminal ID and/or agent ID, from the output unit 26, the communication unit 38 transmits the identification information to the detection unit 36. The detection unit 36 has received the mobile terminal ID and/or the agent ID, so the detection unit 36 detects that the mobile terminal device 10 is placed on the charger 16 and the mobile terminal device 10 is located inside the vehicle. The communication unit 38 periodically carries out communication with the mobile terminal device 10. Thus, the detection unit 36 monitors whether the mobile terminal device 10 is placed on the charger 16.

The detection unit 36 may execute an authentication process in which the in-vehicle device 12 is caused to authenticate the mobile terminal device 10. For example, in a rented car or a shared car, the mobile terminal device 10 may register identification information in the server device 14 in advance, receive issuance of check information, and transmit the identification information and the check information to the communication unit 38 at the time of getting on the vehicle, and the detection unit 36 may perform authentication by comparing the check information with check information stored in the server device 14.

When the mobile terminal device 10 is in the state where the mobile terminal device 10 is able to receive electric power from the charger 16, the communication unit 38 and the output unit 26 are in a communicable location relation. Therefore, the communication unit 38 is able to receive identification information from the mobile terminal device 10, and the detection unit 36 is able to detect the mobile terminal device 10. In the state where the mobile terminal device 10 is placed on the charger 16, the driver is highly likely not to operate the mobile terminal device 10, and it is the timing at which agent display on the mobile terminal device 10 may be switched over to agent display on the in-vehicle device 12. As the detection unit 36 detects the mobile terminal device 10, the detection unit 36 causes the server device 14 to transmit the identification information of the mobile terminal device 10.

The data holding unit 30 of the in-vehicle device 12 holds an in-vehicle terminal ID. As the data holding unit 30 receives identification information from the mobile terminal device 10 via the communication unit 38, the data holding unit 30 holds the mobile terminal ID and/or the agent ID.

The agent execution unit 32, as well as the agent execution unit 22, executes the agent program, and realizes communication with the user by recognizing user's speech and answering the speech. For example, the agent execution unit 32 assists the user in driving by acquiring vehicle speed information and outputting "Slow down because of overspeed" by voice. The agent execution unit 32 generates an agent image, and transmits the agent image to the display control unit 34.

Synchronization information for reflecting the status of the agent being executed by the agent execution unit 32 into the mobile terminal-side agent execution unit 22 is transmitted to the mobile terminal-side agent execution unit 22 via the server device 14. Thus, the mobile terminal-side agent execution unit 22 is allowed to take over the active status of the in-vehicle-side agent execution unit 32. The agent execution unit 32 receives the synchronization information transmitted from the mobile terminal device 10 to the in-vehicle device 12, and the in-vehicle device 12 takes over the active status of the mobile terminal device 10. Thus, when the agent execution unit 32 receives synchronization information transmitted from the agent execution unit 22 via the server device 14, the agent execution unit 32 is able to reflect the status of the agent being executed by the mobile terminal device 10 of a different driver. That is, with a rented car or a shared car as well, the status of an agent being executed by the mobile terminal device 10 is allowed to be transferred to the in-vehicle device 12.

In this way, a process of detecting the mobile terminal device 10 is executed with the use of short-range wireless communication, and a synchronization process is executed with the use of a network via the server device 14. With the use of short-range wireless communication, the in-vehicle device 12 is able to not only detect the mobile terminal device 10 but also acquire the location of the mobile terminal device 10. It is possible to rapidly pass massive information through the synchronization process via the server device 14.

The display control unit 34 executes control for causing the display 12*a* to show an agent image. As shown in FIG. 1, agent display on the in-vehicle device 12 is at an easily viewable location in front of the driver while driving. When the in-vehicle-side display control unit 34 displays an agent image, the mobile terminal-side display control unit 24 stops display of the agent image. That is, any one of the in-vehicle-side display control unit 34 and the mobile terminal-side display control unit 24 performs agent display, and the other does not perform agent display.

When the mobile terminal device 10 has been detected by the detection unit 36, the display control unit 34 displays the agent image by reflecting the status of the agent on the mobile terminal device 10. Thus, when the driver is highly likely not to operate the mobile terminal device 10, the in-vehicle device 12 is able to display the agent image.

When the mobile terminal device 10 comes off from the charger 16 and becomes not able to receive electric power from the charger 16 in the state where the mobile terminal device 10 is able to receive electric power from the charger 16 or when the power of the in-vehicle device 12 turns off, the display control unit 34 ends agent display.

The data holding unit 40 of the server device 14 holds the in-vehicle terminal ID, the mobile terminal ID, and the agent ID. The data holding unit 40 receives the mobile terminal ID and agent ID transmitted from the mobile terminal device 10, and holds the mobile terminal ID and the agent ID in association with each other. The data holding unit 40 holds the in-vehicle terminal ID transmitted from the in-vehicle device 12 and the mobile terminal ID or agent ID in association with each other. Thus, since the in-vehicle terminal ID and the mobile terminal ID are associated with the agent ID, the mobile terminal device 10 is able to transfer information to the in-vehicle device 12 via the server device 14 when the mobile terminal device 10 transmits the information with the mobile terminal ID, and the in-vehicle device 12 is able to transfer information to the mobile terminal device 10 via the server device 14 when the in-vehicle device 12 transmits the information with the in-vehicle terminal ID.

The switching unit 42 switches between agent display on the mobile terminal device 10 and agent display on the in-vehicle device 12. The switching unit 42 starts a process of switching agent display as the switching unit 42 receives the mobile terminal ID or agent ID received by the communication unit 38.

The switching unit 42, as the process of switching agent display, receives synchronization information from the mobile terminal device 10 and transmits the synchronization information to the in-vehicle device 12, transmits an instruction signal to the mobile terminal device 10 to stop agent display, and transmits an instruction signal to the in-vehicle device 12 to start agent display. Thus, the mobile terminal device 10 transmits synchronization information indicating the status of the active agent to the server device 14 and then ends agent display, and the in-vehicle device 12 incorporates the received synchronization information into the agent program and then starts agent display. The switching unit 42 provides an instruction to switch agent display to the mobile terminal device 10 and to the in-vehicle device 12 at the same timing, so display is switched at the same time.

The switching unit 42 also executes a process of switching from display on the in-vehicle device 12 to display on the mobile terminal device 10. For example, when the mobile terminal device 10 comes off from the charger 16 and becomes not able to receive electric power from the charger 16 in the state where the mobile terminal device 10 is able to receive electric power from the charger 16 or when the power of the in-vehicle device 12 turns off, the switching unit 42 switches from agent display on the in-vehicle device 12 to agent display on the mobile terminal device 10. The switching unit 42 receives synchronization information from the in-vehicle device 12 and transmits the synchronization information to the mobile terminal device 10, transmits an instruction signal to the in-vehicle device 12 to stop agent display, and transmits an instruction signal to the mobile terminal device 10 to start agent display.

For example, when destination guidance is provided with the use of the agent program to the driver who moves by transportation, that is, on foot and by vehicle, it is possible to automatically switch between agent display on the mobile terminal device 10 and agent display on the in-vehicle device 12.

By synchronizing the mobile terminal device 10 and the in-vehicle device 12 with each other via the server device 14, the configuration of the communication unit 38 is a simple configuration for just exchanging identification information. By transferring possibly massive synchronization information via the server device 14, it is possible to early complete the synchronization process.

While the synchronization process is being executed via the server device 14, the mobile terminal device 10 transmits a signal for starting agent display to the in-vehicle device 12, and ends agent display on the mobile terminal device 10. Agent display may be switched in this way. According to this mode as well, it is possible to adjust timing to switch agent display.

FIG. 3 is a flowchart for illustrating the process of switching agent display. The driver causes the in-vehicle device 12 to execute the agent program, and the display control unit 24 controls agent display (S10). For example, the driver sets a destination for causing the agent execution unit 22 to provide destination guidance.

The driver gets on the vehicle and turns on the accessory power of the in-vehicle device 12 (S12). The driver places the mobile terminal device 10 on the charger 16 (S14). Thus, the driver allows the mobile terminal device 10 to receive electric power from the charger 16. The output unit 26 of the mobile terminal device 10 transmits the mobile terminal ID and/or the agent ID to the communication unit 38 of the in-vehicle device 12 by short-range wireless communication as the mobile terminal device 10 starts receiving electric power from the charger 16 (S16).

The detection unit 36 detects that the mobile terminal device 10 is located inside the vehicle as a result of receiving the identification information transmitted from the mobile terminal device 10 (S18). Then, the detection unit 36 causes the server device 14 to transmit the mobile terminal ID or agent ID, the detected result indicating that the mobile terminal device 10 has been detected, and the in-vehicle terminal ID (S20).

The switching unit 42 of the server device 14 receives the identification information from the in-vehicle device 12, and starts the synchronization process for incorporating the status of the agent on the mobile terminal device 10 into the in-vehicle device 12 (S22). The switching unit 42 of the server device 14 makes a request of the agent execution unit 22 of the mobile terminal device 10 to transmit synchronization information (S23). The agent execution unit 22 of the mobile terminal device 10 transmits the synchronization information to the server device 14 (S24). The synchronization information includes information about destination guidance that has been executed by the mobile terminal device 10.

The switching unit 42 transmits the received synchronization information to the in-vehicle device 12 (S26). The agent execution unit 32 of the in-vehicle device 12 loads the synchronization information (S28). The agent execution unit 32 transmits information indicating that synchronization has completed to the switching unit 42 (S30).

After completion of the synchronization process, the switching unit 42 transmits an instruction to the mobile terminal device 10 to stop agent display (S32), and transmits an instruction to the in-vehicle device 12 to start agent display (S33). The instruction to stop agent display and the instruction to start agent display are executed substantially at the same timing.

The display control unit 24 of the mobile terminal device 10 receives the instruction to stop agent display, and executes control for stopping agent display (S34). The display control unit 34 of the in-vehicle device 12 receives the instruction to start agent display, and executes control for starting agent display (S35). Thus, when the driver places the mobile terminal device 10 on the charger 16, destination guidance that has been executed by the mobile terminal device 10 is allowed to be continued by the in-vehicle device 12.

As the driver reaches a parking lot near the destination and turns off the accessory power of the in-vehicle device 12 (S36), agent display is ended, and the agent execution unit 32 of the in-vehicle device 12 transmits synchronization information to the server device 14 (S38). The switching unit 42 of the server device 14 transmits the synchronization information to the mobile terminal device 10 (S40). The agent execution unit 22 of the mobile terminal device 10 loads the synchronization information, incorporates the status of the agent being executed by the in-vehicle device 12, and displays an agent image (S42). Thus, after the driver gets off the vehicle, it is possible to continue destination guidance with the mobile terminal device 10.

The embodiment is only illustrative. Various alternative embodiments are possible through combinations of components. Persons skilled in the art understand that the scope of the disclosure also encompasses such alternative embodiments.

In the embodiment, the communication unit 38 that enters a receivable state within approximately 10 centimeters is provided in the charger 16; however, the disclosure is not limited to this mode. For example, the in-vehicle device 12 may include no charger 16 and include the communication unit 38 that enters a receivable state within approximately one meter. The communication unit 38 should be able to receive identification information from the mobile terminal device 10 within a range by which it is determined that the mobile terminal device 10 is located inside the vehicle.

Irrespective of whether the mobile terminal device 10 is placed on the charger 16, the mobile terminal device 10 may be configured not to display an image based on the agent program while the vehicle is moving. According to this mode, the output unit 26 of the mobile terminal device 10 is able to transmit the mobile terminal ID and/or the agent ID to the communication unit 38 of the in-vehicle device 12 even when the mobile terminal device 10 is not placed on the charger 16, and transmits the mobile terminal ID and/or the agent ID by short-range wireless communication of, for example, approximately one meter. The agent execution unit 32 of the in-vehicle device 12 transmits an instruction to the switching unit 42 of the server device 14 to execute the display switching process when the vehicle starts moving based on vehicle speed. According to this mode, when the driver causes the vehicle to move, agent display on the mobile terminal device 10 is automatically stopped, and shifts into agent display on the in-vehicle device 12, so the driver is allowed to drive without viewing the mobile terminal device 10.

What is claimed is:

1. A display control system comprising:
    a switching unit;
    a mobile terminal device configured to display a first agent image by executing a first agent program; and
    an in-vehicle device configured to display a second agent image by executing a second agent program, wherein:
    the in-vehicle device includes
       a detection unit configured to detect the mobile terminal device as a result of receiving identification information from the mobile terminal device, and
       a display control unit configured to, when the mobile terminal device has been detected by the detection unit, automatically cause the in-vehicle device to display the second agent image; and
    the mobile terminal device is configured to, when the display control unit causes the in-vehicle device to display the second agent image, prohibit display of the first agent image on the mobile terminal device,
    wherein the switching unit is configured to transmit a first instruction signal to the mobile terminal device to cause the mobile terminal device to stop display of the first agent image and wherein the mobile terminal device is configured to, as the mobile terminal device receives the first instruction signal from the switching unit, stop display of the first agent image.

2. The display control system according to claim 1, wherein:
    the in-vehicle device includes a charger for supplying electric power to the mobile terminal device; and
    the detection unit is configured to, when the mobile terminal device is in a state where the mobile terminal device is able to receive electric power from the charger, detect the mobile terminal device.

3. The display control system according to claim 2, wherein the state where the mobile terminal device is able to receive electric power from the charger is a state where the mobile terminal device is placed on the charger.

4. The display control system according to claim 2, wherein:
    the charger includes a communication unit configured to be able to carry out short-range wireless communication with the mobile terminal device; and
    the mobile terminal device is configured to, when the mobile terminal device is in the state where the mobile terminal device is able to receive electric power from the charger, transmit the identification information to the communication unit by short-range wireless communication.

5. The display control system according to claim 2, wherein the mobile terminal device is configured to, when the mobile terminal device enters a state where the mobile terminal device is not able to receive electric power from the charger from the state where the mobile terminal device is able to receive electric power from the charger or when power of the in-vehicle device turns off, allow display of the first agent image.

6. The display control system according to claim 1, wherein:
   the display control unit is configured to, as the display control unit detects that a vehicle has started moving, cause the in-vehicle device to display the second agent image; and
   the mobile terminal device is configured to prohibit display of the first agent image on the mobile terminal device while the vehicle is moving.

7. The display control system according to claim 1, wherein:
   the switching unit is configured to transmit a second instruction signal to the in-vehicle device to cause the in-vehicle device to start display of the second agent image simultaneously with transmission of the first instruction signal to the mobile terminal device; and
   the in-vehicle device is configured to, as the in-vehicle device receives the second instruction signal from the switching unit, start display of the second agent image.

8. The display control system according to claim 1, further comprising a server device that includes the switching unit.

9. A display control method of controlling display of a first agent image on a mobile terminal device configured to display the first agent image by executing a first agent program and display of a second agent image on an in-vehicle device configured to display the second agent image by executing a second agent program, the display control method comprising:
   detecting, by the in-vehicle device, the mobile terminal device as a result of receiving identification information from the mobile terminal device;
   when the mobile terminal device has been detected, transmitting, via a server device having a switching unit, a first instruction signal to the mobile terminal device to cause the mobile terminal device to stop display of the first agent image;
   automatically displaying, by the in-vehicle device, the second agent image; and
   after the mobile terminal device has been detected and when the mobile terminal device receives the first instruction signal from the switching unit, prohibiting, by the mobile terminal device, display of the first agent image on the mobile terminal device.

10. The display control system according to claim 1, wherein the second agent image is an anthropomorphic agent image.

11. The display control method according to claim 9, wherein the second agent image is an anthropomorphic agent image.

* * * * *